June 22, 1965 C. NEITZERT 3,191,052

TRIGGER PULSE FORMER

Filed Feb. 1, 1960 2 Sheets-Sheet 1

INVENTOR.
CARL NEITZERT
BY [signature]
ATTORNEY

INVENTOR.
CARL NEITZERT

BY [signature]
ATTORNEY

United States Patent Office 3,191,052
Patented June 22, 1965

3,191,052
TRIGGER PULSE FORMER

Carl Neitzert, Chatham Township, N.J., assignor to General Time Corporation, New York, N.Y., a corporation of Delaware Filed Feb. 1, 1960, Ser. No. 5,926
6 Claims. (Cl. 307—88)

This invention relates to pulse forming circuits and more particularly to pulse forming circuits which utilize the properties of magnetic cores having square hysteresis loop characteristics. Reference is made to my U.S. Patent No. 2,897,380, granted July 28, 1959 and entitled "Magnetic Pulse Counting and Forming Circuits" for a more complete description of some of the structure which is shown and described herein. The above identified patent and the subject invention are assigned to the same assignee.

Various known circuits have relied upon magnetic cores having substantially square hysteresis loop characteristics to form output pulses having uniform characteristics responsive to the receipt of input pulses. In general, circuits of the type described have been adapted to drive magnetic cores into and beyond positive magnetic saturation responsive to the receipt of one or more input pulses. Upon the termination of an input pulse which drives a core beyond magnetic saturation, there is a slight decay of magnetic flux which triggers a device that initiates a flow of current in a reset winding associated therewith. There is a cumulative effect as current builds in the reset winding, thus producing a self sustaining condition which resets the core to negative magnetic saturation, an output pulse being formed during the flow of resetting current. Sometimes, however, the effects produced by the decay of magnetic flux are dissipated over a long period of time and the resetting circuit fails to trigger.

Accordingly, it is an object of this invention to provide new and improved pulse forming circuits. In this connection, it is an object to utilize the properties of magnetic core devices having substantially square hysteresis loop characteristics to control the production and shape of output pulses. More specifically, an object of the invention is to provide means for triggering reset cycles independently of the characteristics of input or driving signals or pulses.

Another object of this invention is to provide pulse forming circuits which are economical to operate. More specifically, an object is to provide pulse forming circuits utilizing magnetic core devices which require less source power and draw less battery current than circuits that were used heretofore.

The above mentioned and other objects and advantages of this invention will be apparent upon reading the attached detailed description and upon making reference to the drawings in which.

Figure 1:
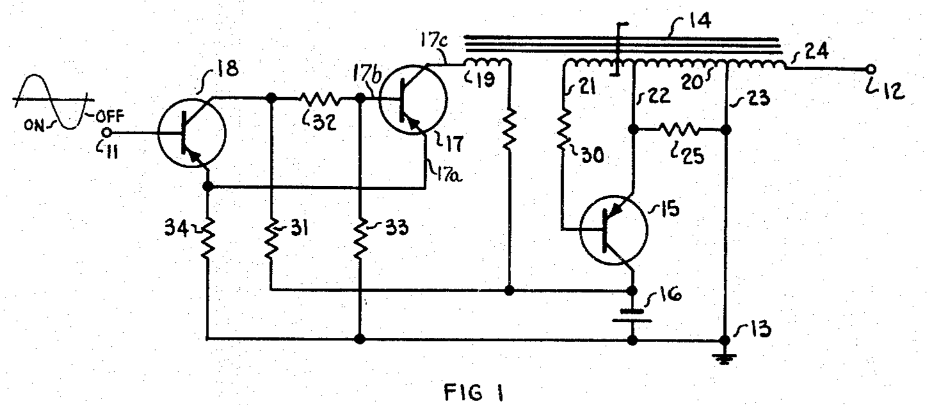
FIGURE 1 shows the circuit details of a pulse forming device which is made in accordance with the principles of the subject invention.
Figure 4:
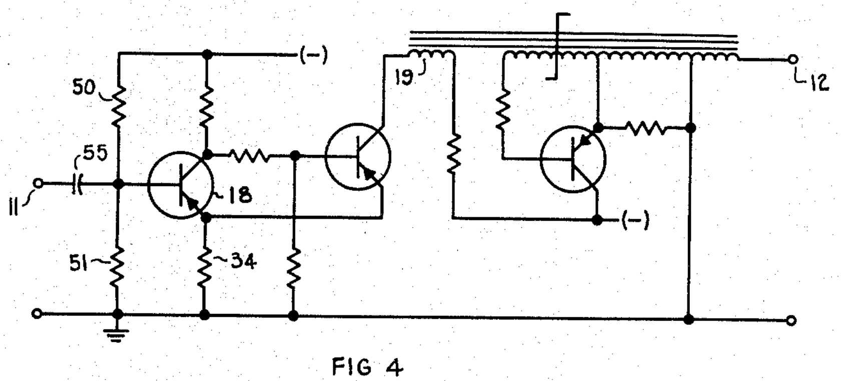
Figure 5:
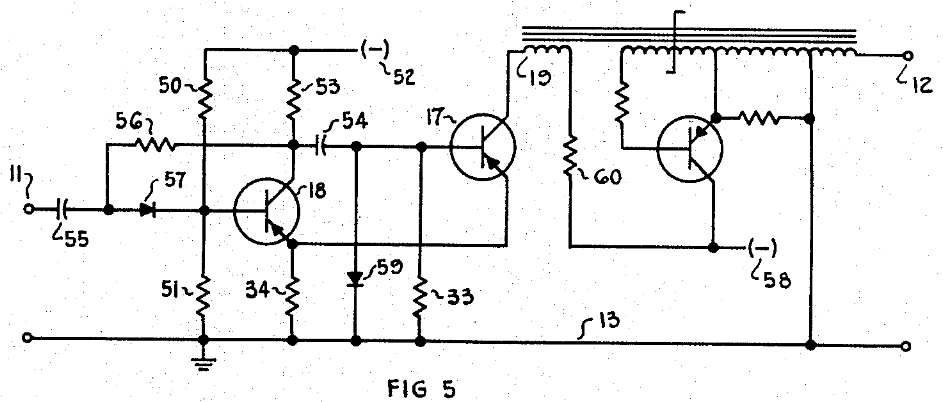
Figure 6:
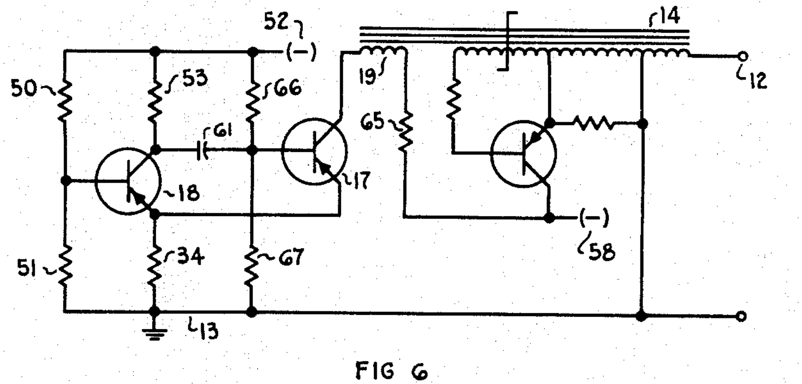

FIGS. 3*a*–3*d* illustrate respectively source or input signals, the voltage pulses which control the core saturation by a saturating or magnetizing winding, the current in the saturating winding, and the output voltage of the device of FIG. 1;

FIG. 4 is a circuit diagram of an embodiment of the invention, having a bistable pulse forming circuit;

FIG. 5 shows the circuit details of an embodiment of the invention utilizing a monostable pulse forming circuit wherein the circuit resets automatically after the generation of an output pulse; and FIG. 6 shows a further modification of the circuit to provide a free running pulse generator.

While the invention is described in connection with preferred embodiments, it will be understood that the invention is not to be limited to the specific embodiment that is shown and described, and that the appended claims are intended to cover the various alternative and equivalent constructions which are included within the spirit and the scope of the invention.

Turning now to FIGURE 1, a basic pulse forming circuit which is made in accordance with this invention is shown as having an input terminal 11, an output terminal 12 and a common bus or ground connection 13. The major circuit elements include a saturable magnetic core 14, a resetting switch 15 which is in this case a P-N-P junction transistor, a direct current power source 16 suitably having its positive terminal grounded, a gating device 17, which is also in this case a P-N-P junction transistor having an emitter 17*a*, a base 17*b* and a collector 17*c*, for energizing saturation winding 19, and a trigger device 18 for selectively controlling the conductivity of gating device 17.

In construction, core 14 is a continuous toroid of spiral-wound thin tape of core material having generally rectangular hysteresis loop characteristics. The direction in which an input or saturating winding 19 is wound about the core and the circuit values are such that current in winding 19 may drive or bias the core 14 to and beyond its positive level of magnetic saturation while current in reset winding 20 may return core 14 to negative magnetic saturation and produce an output pulse. More particularly, winding 20 is preferably a continuous winding having taps or terminals 21–24 which are brought out to provide a trigger circuit including the control turns between taps 21 and 22 which causes resetting switch or transistor 15 to turn off and on, to provide a resetting winding including the turns between taps 22 and 23, and to provide an output circuit including the turns between taps 23 and 24.

Figures 2, 3:
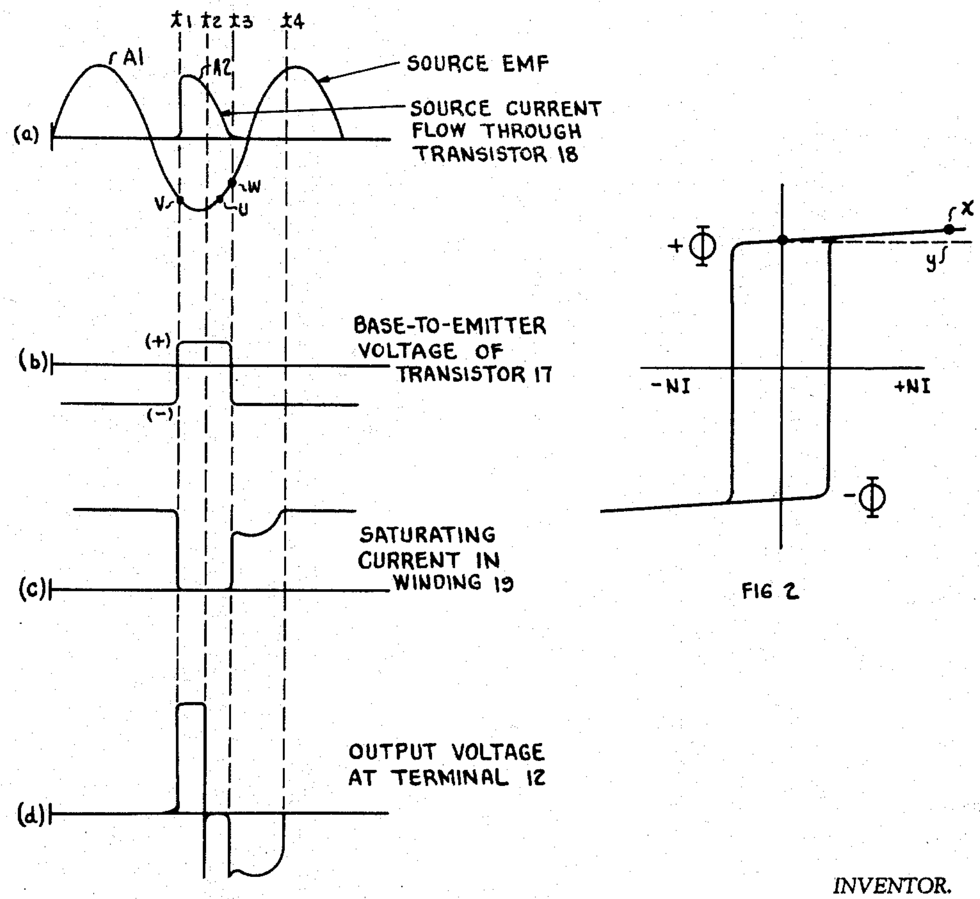
FIG. 2 is a graphical representation of the flux versus ampere turns for the magnetic material employed in the saturable core device that is shown in FIGS. 1 and 4–6.

In operation, gating transistor 17 is turned on, saturating winding 19 is energized, and core 14 is driven to and beyond positive magnetic saturation—as indicated in FIG. 2 by level "*y*" and point "*x*" respectively. At this time the potential on base tap 21 is less negative than emitter tap 22; therefore, resetting transistor 15 is in an "off" condition. When gating transistor 17 is turned off, winding 19 is deenergized and magnetic flux in core 14 decays as the core snaps back from super saturation point "*x*" to the remanent positive saturation level "*y*" as shown in FIG. 2. The decaying magnetic flux which occurs during snap-back induces a voltage of opposite polarity in the turns of winding 20. Therefore, point 21 becomes more negative than point 22 and resetting transistor 15 turns on. (Resistance 30 is a current limiting and temperature compensating device.)

A reset cycle is triggered by the flow of resetting current after transistor 15 turns on. More particularly, when transistor 15 turns on, it functions as a simple switch that is connected in series between battery 16 and taps 22 and 23 of winding 20. Current flows in winding 20 and core 14 is biased to negative magnetic saturation. Resistance 25 damps parasitic oscillations during saturation but has little effect during the reset cycle. While the resetting current flows, the voltage induced in the turns between taps 21 and 22 holds resetting transistor 15 in an "on" condition.

An output signal appears at terminal 12 when a voltage is induced in the output turns between taps 23 and 24 during the flow of resetting current. Stated another way, the portion of winding 20 which is between taps 22 and 23 acts as a primary winding and the portion between taps 23 and 24 acts as a secondary winding of an output transformer while the magnetic bias of core 14 is switching from positive to negative magnetic saturation.

As will be obvious from the foregoing explanation, the triggering or control of the resetting circuit depends upon the voltage which is induced in the turns of winding 20 that are located between taps 21 and 22. The potential of the induced voltage depends, in turn, upon the abruptness with which magnetic flux decays when the energizing current is removed from saturating winding 19. In the above mentioned patent, 2,897,380, the resetting cycle is triggered automatically following the termination of an input signal having a relatively steep trailing edge. On the other hand, input signals may also be terminated by a trailing edge having a relatively small slope so that the control voltage which is induced between taps 21 and 22 of winding 20 does not reach a potential which is sufficient to trigger the resetting circuit.

In accordance with this invention, means are provided in the form of a circuit including a pair of transistors for resetting the core to negative magnetic saturation independently of the characteristics of input signals. More particularly, when zero or positive voltage is applied to input terminal 11 in FIG. 1, the base of a P-N-P junction transistor serving as the trigger device 18 is made more positive than the emitter thereof, thus biasing transistor 18 to a non-conducting state. A voltage divider consisting of resistances 31, 32, and 33 is connected across battery 16 to establish a negative control potential at the base of gating transistor 17. Since the emitter of transistor 17 is normally more positive than its base owing to current flow from battery 16 through resistance 34, transistor 17 is normally saturated and maximum current flows between its emitter and collector and through saturating winding 19. Therefore, during quiescent periods or when a positive voltage is applied at terminal 11, core 14 is driven to and beyond positive magnetic saturation. It should be noted that resistor 34 is common to the emitters of transistor 17 and 18; therefore, after gating transistor 17 begins to conduct and in view of the voltage drop across resistance 34 which is caused by the ensuing current flow, the emitter of trigger transistor 18 is made more negative, thus helping to bias it further into a non-conducting state.

To turn on trigger transistor 18, a negative input signal is applied to terminal 11 which is sufficient to make the base of trigger transistor 18 more negative than the emitter thereof. Additional current now flows through the circuit extending from the negative pole of battery 16, through resistance 31, the collector and emitter terminals of transistor 18 and common emitter resistance 34 to the positive terminal of battery 16. Therefore, the biasing potential extended through resistance 32 to the base of gating transistor 17 becomes less negative. Responsive thereto, the conductivity of gating transistor 17 is reduced, thereby reducing the flow of current through common emitter resistance 34, thus making the emitter of transistor 18 more positive and allowing a greater current flow therethrough. Thus, there is a cumulative and regenerative action which has the effect of making the biasing potential on the base of gating transistor 17 more positive and of increasing the current flow through transistor 18. Transistor 17 quickly turns off and reduces the current through saturating winding 19 to zero.

The time required for the cumulative and regenerative action described above is such that decaying magnetic flux in the turns between taps 21 and 22 triggers the reset cycle, thus making the circuit independent of the characteristics of an input signal.

To drive core 14 into positive magnetic saturation when the input signal at terminal 11 is removed or reduced below a critical value, a reverse cumulative action is initiated. When the signal is removed, the base of transistor 17 and the emitter of transistor 18 are made more negative. Thereafter transistor 17 is again saturated and transistor 18 is renedered non-conductive.

An overall lower consumption of source power results from the use of transistor 18 which provides the above described triggering function as distinguished from the consumption of source power in similar circuits wherein no trigger circuit is provided and gating transistor 17 is turned off responsive to the end of an input signal. This is because a lower source E.M.F. is required, and because the peak source current is only about one-fourth as great as it is when transistor 18 is not provided. Moreover, when transistor 18 is used, less current is required from battery 16 to produce the required peak magnetic saturation in core 14.

FIG. 3 graphically illustrates the manner in which the components of FIG. 1 cooperate to form a pulse at output terminal 12. The information that is conveyed by each of the curves which is shown in FIG. 3 is identified by a legend adjacent the end thereof. The horizontal axis of all four curves is a time scale; therefore, each curve is a plot of the manner in which the electrical values vary with respect to time. For the purposes of this explanation, it is assumed that the circuit values are arranged to provide an output pulse at terminal 12 (FIG. 1) every time that an input pulse or signal appears at terminal 11.

For input signals (FIG. 3*a*), there is shown a sinusoidal wave form A1 which is applied by any suitable driving source (not shown) to input terminal 11 (FIG. 1). When the sinusoidal wave is in its negative half-cycle, and the instantaneous potential which appears on the base of transistor 18 has exceeded a threshold amount (point V on curve A1), transistor 18 turns on—the time of "turn-on" being indicated by the reference character "$t1$." The reference character "$t3$" indicates the time when transistor 18 turns off because the potential of wave form A1 falls below the point where conductivity is sustained (i.e., point W on wave form A1). During the interval between time $t1$ and $t3$, current flows from the source through transistor 18 in the manner indicated by wave form A2. That is, the flow of source current peaks sharply after transistor 18 turns on and thereafter falls away in accordance with the reducing negative potential that is applied to the base of transistor 18 from the driving source. When the potential of the driving wave A1 falls to point W, transistor 18 turns off and current flow ceases thereby terminating pulse A2 of FIG. 3*a*.

The base to emitter voltage of gate transistor 17 is shown in FIG. 3*b*. That is, during that portion of the negative half-cycle in the signal emanating from the driving source when transistor 18 is drawing current (i.e., wave form A2) transistor 17 turns off because its base becomes positive relative to its emitter. As long as transistor 17 is conducting saturating current flows in input or saturating winding 19, as indicated by the curve of FIG. 3*c*. The saturating current in winding 19 drops abruptly when transistor 17 turns off at time $t1$. When transistor 17 turns on at time $t3$, the current in winding 19 rises abruptly. Thereafter, during the interval between times $t3$ and $t4$, the amount of current flowing in winding 19 is determined by the rising branch of the hysteresis loop which terminates at point $y$, on the curve in FIG. 2. After time $t4$ the current is limited by the resistance of the circuit. That is, before the saturation of core 14, the resistance of winding 19 is substantial because most of the electrical energy is required to magnetize the core material; therefore, there is limited current flow. After saturation, the resistance of winding 19 falls because little of the applied energy is required to magnetize the core material; therefore, substantial current flows.

The output signal is shown in FIG. 3*d* which is a curve that indicates the voltage at terminal 12 (FIG. 1). At time $t1$, the current in winding 19 falls abruptly thereby inducing a signal by transformer action in the control turns of winding 20 that are between taps 21 and 22. Responsive thereto, resetting current flows in the turns between taps 22 and 23, as explained above—negative magnetic saturation of the core material being reached at time $t2$. During the interval between times $t1$ and $t2$, a maximum voltage appears at output terminal 12 responsive to the flow of resetting current. During the interval between times *t2* and *t3*, the magnetic flux in core 14 does not change substantially and no output signal is induced in the output winding between taps 23 and 24. At time *t3*, gate transistor 17 begins to conduct and an output signal of opposite polarity is produced in the output windings between taps 23 and 24, thereby providing a negative output voltage at terminal 12. Although the negative output signal which appears between times *t3* and *t4* may have some use, the circuit is primarily designed to form the positive pulse which appears between times *t1* and *t2*. The shape of the output voltage curve occurring between times *t3* and *t4* is determined by the shape of the saturation current curve of FIG. 3*c*, which, in turn, is a function of the magnetic characteristics of the core material.

FIGS. 4–6 show how the basic circuit of FIG. 1 may be modified to accommodate the requirements of various logic circuits which may be used in conjunction with the invention. More particularly, the embodiment of FIG. 4 includes a bi-stable device which functions in connection with a source of low energy "off" and "on" pulses that trigger the magnetizing and resetting cycles. Except as explained hereinafter, all components of FIG. 4 function as described above in connection with FIG. 1—similar components being identified in the various figures by the same reference characters.

In FIG. 4, trigger transistor 18 is biased to become a bi-stable device. Referring to FIG. 3*a*, it is seen that transistor 18 may or may not conduct when the base thereof is biased to a potential having an absolute value with respect to ground between points V and W on curve A1, depending upon whether transistor 18 was or was not turned on previously. That is, if an input signal which is applied to terminal 11 has an E.M.F. that falls between point V as the lowest or most negative potential and point W as the highest or least negative potential of curve A1, transistor 18 maintains conductivity if it was previously turned on, and remains non-conductive if it was previously turned off. Therefore, if the base of transistor 18 is biased to a potential which is at or about mid-point U between low point V and high point W of curve A1, trigger transistor 18 becomes bi-stable.

To establish a bi-stable circuit, the base of transistor 18 is normally biased to a potential (point U in FIG. 3*a*) which is established by a voltage divider network including resistances 50 and 51. When a driving source (not shown) applies a suitable pulse to capacitor 55, a short negative going spike voltage biases the base of transistor 18 to a potential which is more negative than point V in FIG. 3*a*, thus triggering transistor 18 into its conductive state. Thereafter, transistor 18 is held in its conductive state by the normal biasing potential which is applied through voltage divider network 50 and 51. When trigger transistor 18 conducts, gating transistor 17 turns off and an output pulse appears at terminal 12, as explained above. At a later time, the driving source applies a signal to capacitor 55 to provide a positive spike voltage which turns off transistor 18 by making its base more positive than point W in FIG. 3*a*. Thus the bi-stable circuit of FIG. 4 may be especially useful when it is necessary to reduce the loading on preceding circuits by utilizing trigger pulses having a minimum energy.

When the width of the current pulse is applied to saturating winding 19 (the curve of FIG. 3*c*) must be independent of the width of an input pulse (points V and W in the curve of FIG. 3*a*), the circuit may be modified to provide a monostable circuit as shown in FIG. 5. More particularly, the circuit values of voltage divider 50–51 are changed so that trigger transistor 18 is normally conductive under quiescent conditions. The gating transistor 17 is normally non-conductive since the base thereof is at ground potential because no current is flowing in resistance 33 and since the emitter thereof is made negative by the flow of current from battery 52 through resistance 53 and the collector-emitter circuit of transistor 18. Battery 52 is connected through resistance 53 to one side of capacitor 54 and ground on bus 13 is applied through resistance 33 to the other side. Thus, capacitor 54 charges; however, the charge is relatively small due to the voltage drop across resistance 53.

In order to produce an output pulse from the circuit of FIG. 5, an input pulse is applied at terminal 11, thereby charging capacitor 55 and providing a positive voltage spike pulse at the junction of resistance 56 and diode 57. Trigger transistor 18 turns off because the voltage spike pulse makes the base positive relative to the emitter thereof. When transistor 18 turns off, the current which flowed from negative battery 52 through resistance 53 and the collector of transistor 18 stops abruptly and the potential becomes more negative at the collector thereof. Capacitor 54 charges and the base of gating transistor 17 becomes more negative with respect to the emitter thereof; whereupon, transistor 17 turns on. As soon as transistor 17 turns on, current flows from bus 13 through common emitter resistance 34, the emitter and collector of transistor 17, winding 19 and resistance 60 to negative battery 58. Thus, the emitter of transistor 18 is made negative relative to the base thereof, thereby holding transistor 18 in an "off" condition after the voltage spike pulse applied through capacitor 55 and diode 57 has subsided. Also responsive to the current flow through the circuit including winding 19, core 14 is driven into positive magnetic saturation. After a period of time which is measured by the charging characteristics of the circuit comprised of the capacitor 54 and the resistance 53 and 33, the current which flows from negative battery 52 through resistance 53 terminates when capacitor 54 becomes fully charged. Without a charging current voltage drop across resistor 55 the base of transistor 17 becomes positive relative to the emitter thereof and transistor 17 turns off, thereby producing an output pulse at terminal 12, as explained above in connection with FIG. 1.

When gating transistor 17 turns off, the current flow through common emitter resistance 34 ceases and the potential on the emitter of transistor 18 becomes positive relative to the base thereof; hence, transistor 18 is switched on. As transistor 18 begins to conduct, its collector becomes more positive; hence, the base of transistor 17 is made more positive to cause a quick cutoff. Diode 59 is provided to shorten the discharge of capacitor 54.

Thus, it is seen that the time during which winding 19 is energized is measured by the charging characteristics of capacitor 54 and not by the width of an input pulse which is applied to terminal 11.

The input pulse which was originally applied at terminal 11, may terminate at any time. However, there is no effect since diode 57 blocks the negative pulse which emanates from capacitor 33. Resistance 56 provides means for draining the charge from capacitor 33.

A time measuring device in the form of capacitor 61 and its associated resistances 34, 53, and 67 is used to provide a free running pulse generator, i.e. the basic circuit is modified as shown in FIG. 6. In this circuit, transistors 17 and 18 conduct alternately. Transistor 17 is biased by voltage divider 66–67 so that it conducts while capacitor 61 is charging and is non-conducting while capacitor 61 is discharging. Trigger transistor 18 is biased by voltage divider 50–51 so that it conducts while gating transistor 17 is non-conducting and is non-conducting while transistor 17 conducts. Let transistor 18 be initially non-conducting. Capacitor 61 charges as a result of current flowing from ground, through resistance 67 to the right-hand terminal of capacitor 61 and from the left-hand terminal of capacitor 61, through resistance 53 to negative battery 52. This charging current, flowing through resistance 67 is sufficient to make the base of transistor 17 more negative than its emitter thus causing transistor 17 to conduct. The current of transistor 17, flowing through resistance 34 biases the emitter of transistor 18 more negative than its base so that transistor 18 does not conduct. As capacitor 61 approaches its final voltage, its charging current decreases making the base of transistor 17 less negative and causing a decrease of the current in transistor 17. This reduction in current reduces the voltage across resistance 34. At some point the emitter and base of transistor 18 are at the same potential after which transistor 18 starts to conduct. When transistor 18 conducts its collector potential becomes less negative due to the increased voltage across resistance 53. Because of the change in potential of the left-hand terminal of capacitor 61, it starts to discharge through transistor 18 and resistance 34 and through resistance 67. The resulting voltage across resistance 67 holds transistor 17 non-conducting. Transistor 18 conducts and transistor 17 is non-conducting until the discharge current of capacitor 61 falls below a certain value. At this time, transistor 17 starts to conduct, the additional current through resistor 34 turns transistor 18 off and capacitor 61 starts to recharge.

An output pulse is generated when transistor 17 turns off. That is, capacitor 61 is charged over a circuit extending from battery 52 through resistance 53, capacitor 61 and resistance 67 to ground on bus 13. As capacitor 61 charges, the base of transistor 17 becomes more positive; whereupon, transistor 17 cuts off. Responsive thereto, magnetic flux in core 14 decays and triggers a resetting cycle, thereby producing an output pulse at terminal 12, as explained above.

When transistor 17 cuts-off, current no longer flows through common emitter resistance 34, the emitter of transistor 18 becomes more positive relative to the base thereof; therefore, transistor 18 turns on and the cycle repeats.

Thus, it is seen that the circuit of FIG. 6 provides a free running pulse generator which cyclically produces pulses that recur in a timed sequence which is controlled by the charging and discharging characteristic of capacitor 61.

The accompanying drawings show various modifications of a pulse forming circuit. In each case, resistance 34 which is common to the emitter circuits of both transistors gives the positive feedback which provides the trigger action. Therefore, the collector of transistor 17 may be used to control the saturation of winding 19. It should be understood, however, other known trigger circuits may also be used to obtain the coupling which controls the flow of saturation current. For example, saturation current in winding 19 may be connected in a feedback loop extended from the collector of transistor 17 to the base of transistor 18. A circuit of this type may be especially desirable when the trigger circuit must be effected by the flow of current in winding 19.

I claim as my invention:

1. A pulse forming circuit comprising a magnetic device having substantially square hysteresis loop characteristics, first and second windings associated with said device, means comprising a normally conductive transistor for energizing said first winding to bias said magnetic device to and beyond a first state of magnetic saturation and normally maintaining said magnetic device biased beyond said first state of magnetic saturation, means responsive to the receipt of input signals for energizing a second transistor to cut off said normally conductive transistor thereby de-energizing said first winding, and means responsive to decaying magnetic flux following said de-energizing of said first winding for triggering the flow of current through said second winding to bias said device to a second state of magnetic saturation.

2. Apparatus for providing uniform output signals comprising a saturable reactor core having a substantially rectangular hysteresis loop and rising magnetic characteristics extending beyond the loop saturation level, a saturation winding on said core having a number of turns which are sufficient to drive said core from a negative level of magnetic saturation to and beyond a positive level of magnetic saturation and normally maintaining said core magnetized beyond said positive level of magnetic saturation, a pair of transistors each having at least emitter and collector terminals, means comprising a circuit which is common to said emitter terminals for biasing one of said transistors between conductive and non-conductive conditions, means for rendering the other of said transistors conductive whereby current flow in said common emitter circuit biases said one transistor to a non-conductive condition, means responsive to current flow through said collector terminal of said other transistor for energizing said saturation winding, means responsive to the receipt of input signals for rendering said one transistor conductive, means responsive to current emanating from said one transistor when in said conductive condition for rendering said other transistor non-conductive, thereby de-energizing said saturation winding, means responsive to the drop of core flux which occurs upon said de-energization of said saturation winding for resetting said core to a said negative level of magnetic saturation, and means comprising an output winding on said core for supplying output signals during said resetting of said core.

3. A circuit for forming output pulses, comprising in combination, means for receiving an input signal, a saturable reactor core having a substantially rectangular hysteresis loop with a rising magnetization characteristic beyond the loop saturation level, a saturating winding on said core, first transistor means normally biased to conduction for effecting magnetizing current flow in said saturation winding to drive said core to said loop positive saturation level and beyond and maintaining said current, second transistor means responsive to said input signal to bias said first transistor means to non-conduction, sensing and resetting windings on said core, said sensing winding having a voltage induced therein upon termination of said magnetizing current, a third transistor means responsive to said induced voltage in said sensing winding for effecting current flow in said resetting winding to drive the core to its negative saturation level, and means for deriving an output pulse.

4. A pulse forming circuit comprising means for receiving input signals, a magnetic core having a substantially rectangular hysteresis loop characteristic and having wound thereon saturating, sensing and resetting windings, respectively, a first and second transistor, said first transistor energizing said saturating winding to bias said core to and beyond a first state of magnetic saturation and normally maintaining said core biased beyond said first state of magnetic saturation, said second transistor responsive to said input signal to bias said first transistor to non-conduction, said sensing winding producing an induced voltage in response to decay of current in said saturating winding upon non-conduction by said second transistor, means responsive to said induced voltage to energize said resetting winding to reset the core to its negative saturation level, and means responsive to the resetting of the core for deriving an output pulse.

5. A circuit for forming output pulses comprising in combination, means for receiving an input signal, a magnetic core having a substantially rectangular hysteresis loop with a rising magnetization characteristic beyond the loop positive and negative saturation levels, a winding for magnetizing said core in positive and negative magnetic directions, a first transistor for energizing a portion of said winding for magnetizing said core to and beyond the loop positive saturation level and for maintaining a core magnetizing current, a second transistor coupled to said first transistor, said second transistor resonsive to a portion of said input signal to bias said first transistor to non-conduction thereby terminating said magnetization current, means responsive to the termination of the magnetizing current for resetting the core to said negative saturation level and forming an output pulse, said second transistor being biased to non-conduction by another portion of said input signal thereby allowing said first transistor to conduct and again saturate said core beyond the loop positive saturation level.

6. A circuit as in claim 5 further comprising means providing said second transistor with a bias voltage in the range of stability in both the conductive and non-conductive state.

References Cited by the Examiner

UNITED STATES PATENTS

| | | | |
|---|---|---|---|
| 2,897,380 | 7/59 | Neitzert | 307—88 |
| 2,920,213 | 1/60 | Elias | 307—88 |
| 2,951,949 | 9/60 | Kunzleman et al. | 307—88 |
| 2,989,686 | 6/61 | Pinckaers et al. | 307—88 |

IRVING L. SRAGOW, *Primary Examiner.*

EVERETT R. REYNOLDS, JOHN T. BURNS, *Examiners.*